(12) United States Patent
Ozturk et al.

(10) Patent No.: US 7,986,779 B2
(45) Date of Patent: Jul. 26, 2011

(54) EFFICIENT ELLIPTIC-CURVE CRYPTOGRAPHY BASED ON PRIMALITY OF THE ORDER OF THE ECC-GROUP

(75) Inventors: Erdinc Ozturk, Worcester, MA (US); Vinodh Gopal, Westboro, MA (US); Gilbert Wolrich, Framingham, MA (US); Wajdi K. Feghali, Boston, MA (US)

(73) Assignee: Intel Corporation, Santa Clara, CA (US)

(*) Notice: Subject to any disclaimer, the term of this patent is extended or adjusted under 35 U.S.C. 154(b) by 1042 days.

(21) Appl. No.: 11/772,170

(22) Filed: Jun. 30, 2007

(65) Prior Publication Data

US 2009/0003596 A1 Jan. 1, 2009

(51) Int. Cl.
H04K 1/00 (2006.01)
H04L 9/00 (2006.01)
H04L 9/28 (2006.01)
G06F 7/72 (2006.01)

(52) U.S. Cl. ........... 380/30; 380/28; 380/46; 708/490; 708/491; 708/492; 708/518; 708/523; 708/525

(58) Field of Classification Search .............. 380/30
See application file for complete search history.

(56) References Cited

U.S. PATENT DOCUMENTS

| 5,521,980 | A  | * | 5/1996  | Brands     | 380/30  |
|-----------|----|---|---------|------------|---------|
| 6,876,745 | B1 | * | 4/2005  | Kurumatani | 380/28  |
| 7,080,109 | B2 | * | 7/2006  | Koc et al. | 708/491 |
| 7,590,235 | B2 | * | 9/2009  | Hubert     | 380/30  |
| 7,702,105 | B1 | * | 4/2010  | Gura et al.| 380/255 |
| 2003/0081771 | A1 | * | 5/2003 | Futa et al. | 380/30 |
| 2007/0168411 | A1 | * | 7/2007 | Hubert      | 708/492 |
| 2009/0285386 | A1 | * | 11/2009 | Takashima  | 380/28 |

OTHER PUBLICATIONS

Ananyi, K., 'Design of a Reconfigurable Processor for NIST Prime Field ECC', 2006, Dept. of Electrical and Computer Engineering, Univ. of Victoria, entire document, http://citeseerx.ist.psu.edu/viewdoc/download?doi=10.1.1.95.1321&rep=rep1&type=pdf.*
Guajardo, J., et al, 'Efficient Hardware Implementation of Finite Fields with Applications to Cryptography', Sep. 26, 2006, © Springer Science, entire document, http://www.crypto.rub.de/imperia/md/content/texte/publications/journals/efficient_hard_finitef.pdf.*
A. Menezes, "Efficient Implementation", Handbook of Applied Cryptography, Chapter 14, 1997, pp. 591-634.
M. Brown et al., "Software Implementation of the NIST Elliptic Curves Over Prime Fields", Lecture Notes In Computer Science; vol. 2020, Proceedings of the 2001 Conference on Topics in Cryptology: The Cryptographer's Track at RSA, Springer Verlang, 2001, pp. 205-265.
Certicom Corp., Standards for Efficient Cryptography, "SEC 1: Elliptic Curve Cryptography", Version 1.0, Sep. 20, 2000, 96 pages.

* cited by examiner

*Primary Examiner* — Edan Orgad
*Assistant Examiner* — Ronald Baum
(74) *Attorney, Agent, or Firm* — Caroline M. Fleming

(57) ABSTRACT

Time to perform scalar point multiplication used for ECC is reduced by minimizing the number of shifting operations. These operations are minimized by applying modulus scaling by performing selective comparisons of points at intermediate computations based on primality of the order of an ECC group.

20 Claims, 7 Drawing Sheets

EFFICIENT ELLIPTIC-CURVE CRYPTOGRAPHY BASED ON PRIMALITY OF THE ORDER OF THE ECC-GROUP

FIELD

This disclosure relates to public key cryptography and in particular to elliptic curve cryptography.

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithm may be used to authenticate keys for encryption algorithms such as the Data Encryption Standard (DES) and the Advanced Encryption Standard (AES).

RSA and DH provide security based on the use of number theory. RSA is based on factoring the product of two large prime numbers. DH is based on a discrete logarithm for finite groups. Typically, public key systems use 1024-bit parameters for RSA and DH.

The Elliptic Curve Cryptosystem (ECC) is a relatively new public key algorithm that is based on the arithmetic of elliptic curves. ECC provides the same level of security as RSA and DH but uses parameters having fewer bits than parameters used by RSA or DH. For example, to authenticate an 80-bit key, 1024-bit parameters are recommended for the RSA and DH public key algorithms and 160-bit parameters are recommended for the ECC algorithm. For a 128-bit key 3072-bit parameters are recommended for the RSA and DS public key algorithms and 224-bit parameters are recommended for the ECC algorithm.

Elliptic curve cryptography (ECC) provides more security than traditional cryptosystems based on integer fields for much smaller key-sizes. It is very efficient from the perspectives of computes, power, storage and bandwidth to transmit keys. It scales much better than the traditional schemes and is therefore likely to gain more popularity with increased need for higher security strengths. Elliptic curves are algebraic/geometric objects that have been extensively studied by mathematicians. These curves can be applied to cryptography by suitably defining the underlying field and constraining the parameters such that the points on the curve form a Group (suggested in 1985 independently by Neil Koblitz and Victor Miller).

Elliptic curves for cryptographic applications are defined over prime fields (Galois Field Prime (GFP)) and binary fields (Galois Field Binary (GF2m)) GFP and GF2m both have a finite number of points that form a mathematical Group structure. The points can be operated on by special "addition" or "subtraction" operations. For any two points P1 and P2 in the group: P3=P1+P2 is defined. After point-addition has been defined, the basic building blocks of any cryptosystem are computations of the form Q=[k]P. The operation [k]P may be referred to as scalar point multiplication. This can be defined as P added to itself (k−1) times. Note that 1<=k<ord(P), where "ord" is defined as the order of the element of the group. Given P and [k]P, it is computationally infeasible to recover k.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
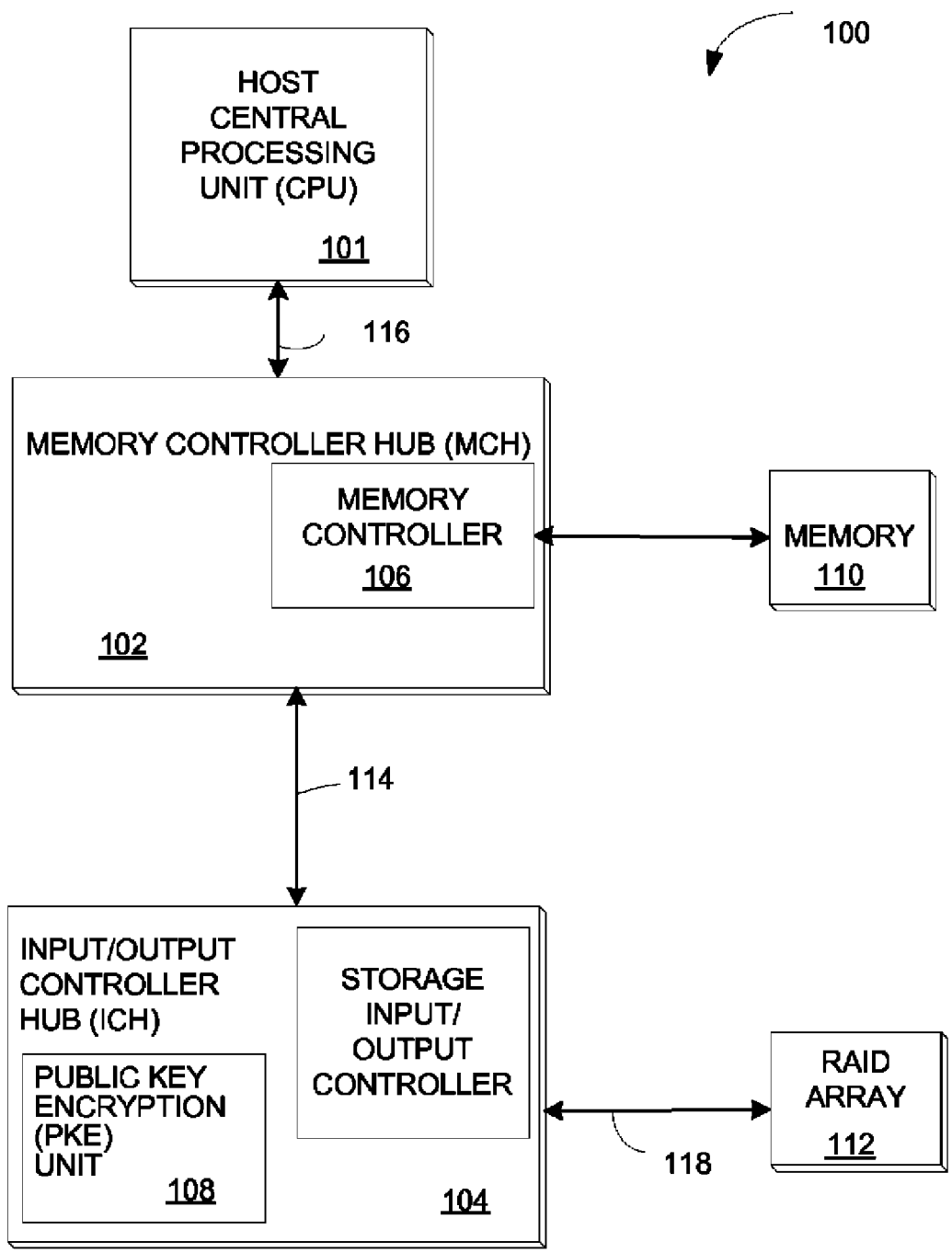
FIG. 1 is a block diagram of a system that includes an embodiment of a Public Key Encryption (PKE) unit to perform computations for ECC.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Federal Information Processing Standard (FIPS) 186-3 describes standard National Institute of Standards and Technology (NIST) elliptic curves. For example, there are standard NIST ECC curves for prime field sizes of 192, 224, 256, 384 and 521 bits and for binary field sizes of 163, 233, 283, 409 and 571 bits.

Modular arithmetic such as modular multiplication (that is, $r=x \cdot y \bmod m$) is typically used to perform computations for ECC. Many of the standard NIST ECC field sizes are not a multiple of 8-bits, for example, the NIST P-521 ECC curve. Thus, the operands used for performing point-addition and point-multiplication may be unaligned with an 8-bit aligned data path or multiplier. In a system having a data path that is a multiple of 8-bits, multiple shift operations are required to align operands (x, y) and the result of modular multiplication (r) to the data path.

Also, there are differences in the manner in which elliptic curves are defined over prime and binary fields. For example, for prime fields the ECC curve is defined by the equation:

$$Y^2 = X^3 + a \cdot X + b$$

where a, b, X, Y are elements of the prime field (numbers modulo p).

For binary fields, the ECC curve is defined by the equation:

$$Y^2 + XY = X^3 + a \cdot X^2 + b$$

where a, b, X, Y are elements of the binary Galois-field GF2m.

These differences make it challenging to support both prime and binary fields.

The basic building blocks of any cryptosystem are computations of the form Q=[k]P, that may be referred to as scalar point multiplication and can be defined as P added to itself (k−1) times. P is defined as a point (x, y) on the ECC curve having an order n and k is an integer that is an element of {1, n−1}. The problem of computing Q=[k]P is similar to group exponentiation. Q is computed in minimal steps when k is a large number using scalar point multiplication. Scalar point multiplication is performed through the use of point addition and point doubling. Point addition and point doubling requires a large number of shifting and multiply operations.

In an embodiment of the present invention, the number of shifting and multiply operations is optimized based on the primality of the order of the ECC group. When the order (n) of the ECC group is prime or when the order (n) of a point on the curve is known, performance of the scalar point multiplication operation is optimized. In other cases, partial checking is enabled as needed to optimize performance. Optimizing based on primality of the order of the ECC group, results in a significant performance increase and reduction in complexity. Performance may be optimized for prime (integer) fields in addition to binary fields and for other co-ordinate systems.

FIG. 1 is a block diagram of a system 100 that includes an embodiment of a Public Key Encryption (PKE) unit 108 to perform computations for ECC. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 110. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 110 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
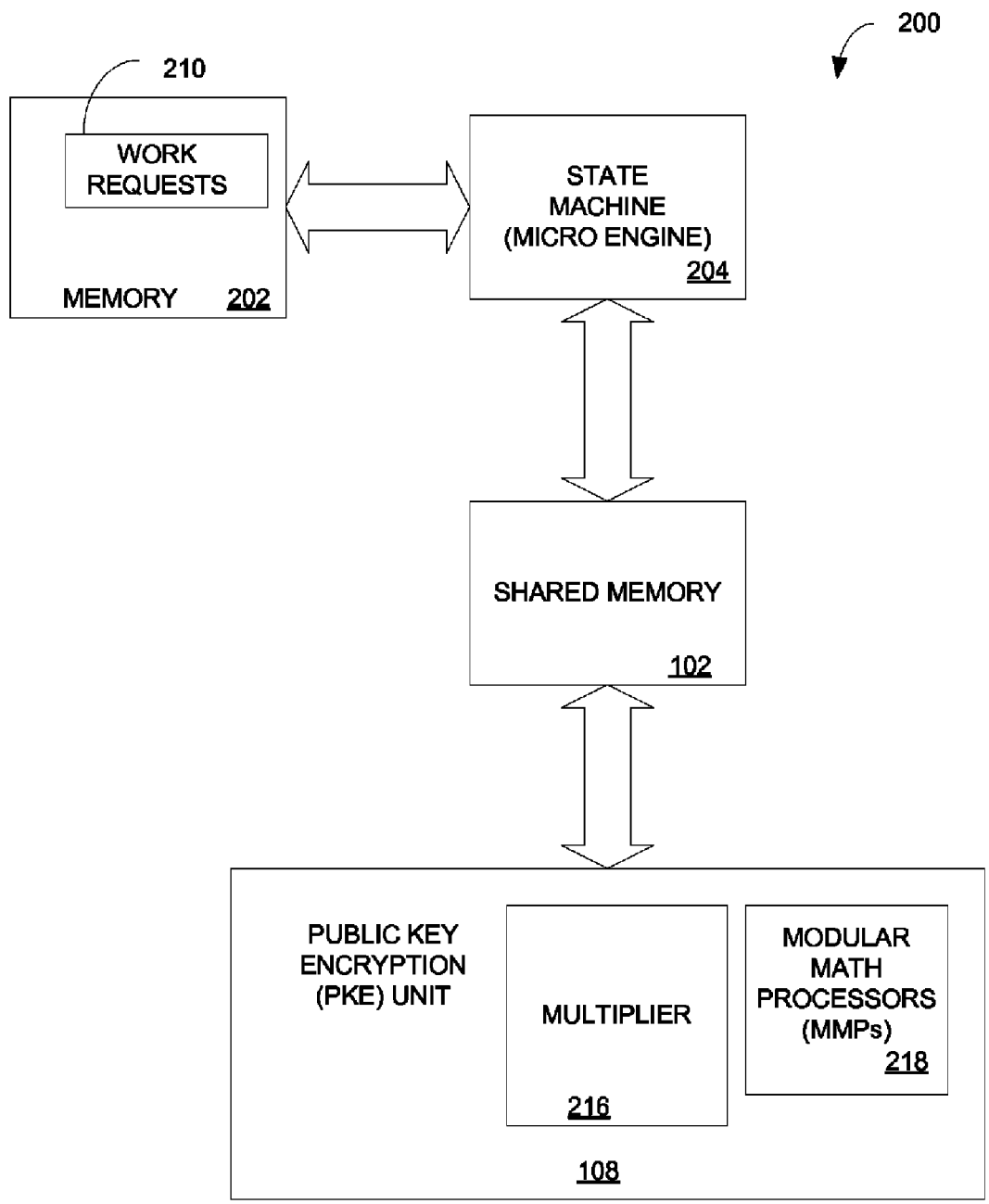
FIG. 2 is a block diagram of an embodiment of a system that includes a public key encryption (PKE) unit.

FIG. 2 is a block diagram of an embodiment of a system 200 that includes a public key encryption (PKE) unit 108.

The system 200 includes a memory 202 for storing work requests 210 and a state machine (micro engine) 204 which processes the work requests 210. The state machine 204 issues instructions to the PKE unit 108 through a shared memory 206.

In one embodiment the state machine 204 may be one of a plurality of micro engines in a processor, for example, a micro engine in an IXP® 2400 processor available from Intel Corporation. The PKE unit 108 offloads computationally expensive operations from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

Based on a work request 210 stored in memory 200, the state machine 204 may offload computationally expensive operations in Diffie-Hellman key exchange (DH), Digital Signature Algorithm (DSA) digital signature, Rivest, Shamir, Adleman (RSA) encryption/decryption and primality testing to the PKE unit 108.

The PKE unit 108 includes one or more modular math processors (MMP) 218 and a multiplier 216. The PKE unit 208 may perform modular arithmetic on large numbers. An example of modular arithmetic is a modular exponential operation such as, $g^e$ mod m where g is the base, e is the exponent and m is the modulus.

Figure 3:
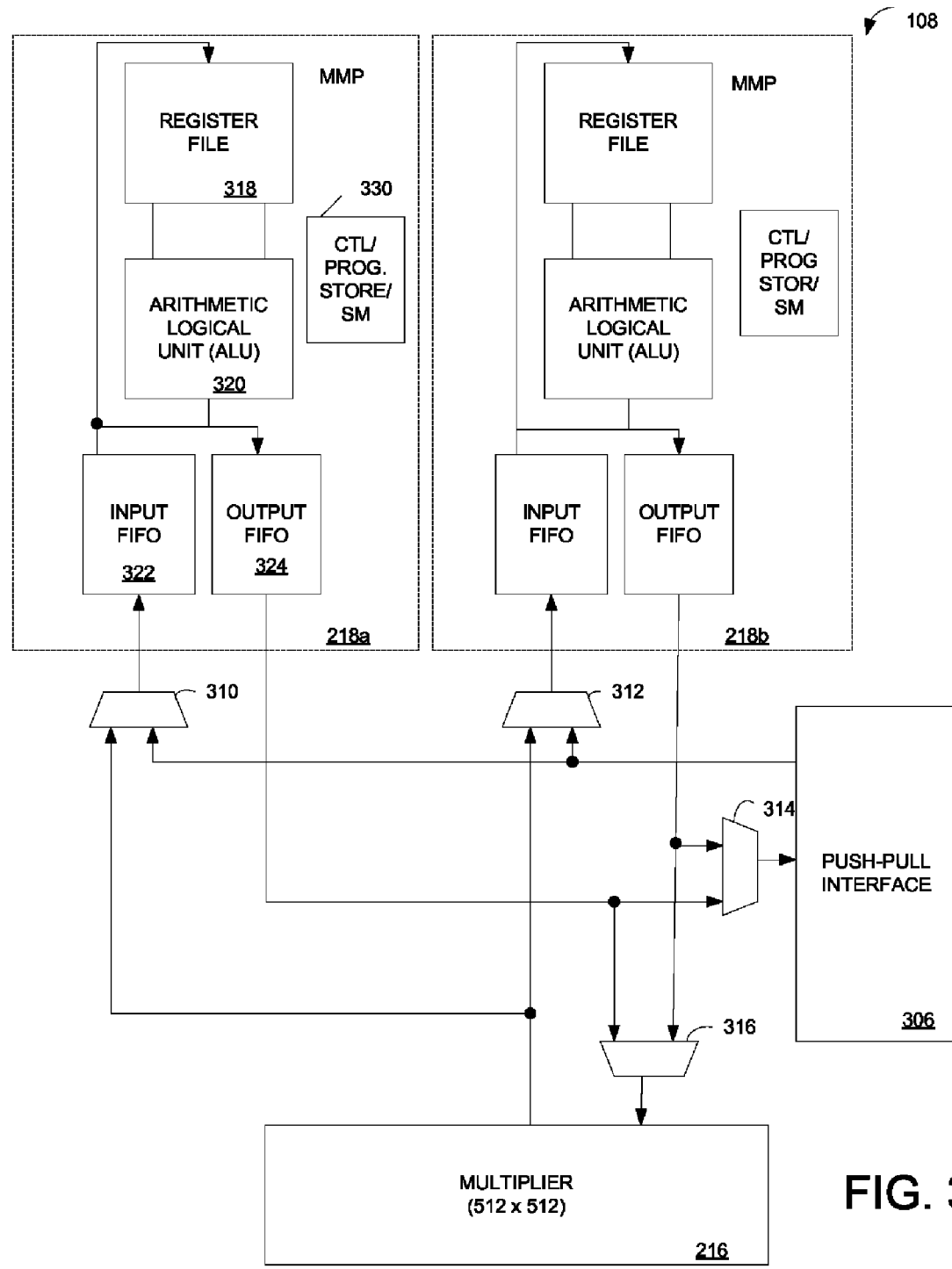
FIG. 3 is a block diagram of an embodiment of the PKE unit shown in FIG. 2.

FIG. 3 is a block diagram of an embodiment of the PKE unit 108 shown in FIG. 2. In the embodiment shown, the PKE unit 108 includes two modular math processors (MMPs) 218a, 218b. However, the PKE unit 108 is not limited to two MMPs 218a, 218b, in other embodiments, the PKE unit 108 may have more than two MMPS.

The PKE unit 108 performs computationally expensive mathematical computations such as modular exponentiation, division and greatest common divisor (gcd). The PKE unit 108 also includes a multiplier 216, which is shared by the MMPs 218a, 218b. In the embodiment shown, the multiplier 216 is a 512×512 multiplier.

Each MMP 218a, 218b includes a respective input First In First Out (FIFO) 322 and an output FIFO 324. The communication path through each MMP 218a, 218b is through the FIFOs 322, 324 by enqueuing data to the input FIFO 322 and dequeuing data from the output FIFO 324. The states of the MMPs 218a, 218b are independent from each other and each MMP 218a, 218b may be concurrently transferring data to/from shared memory 206 (FIG. 2) through the push-pull interface 306.

The multiplier 216 may be accessed via an internal PKE bus by the MMPs 218a, 218b and an arbitration mechanism that includes multiplexers 310, 312, 314 and 316 and associated multiplexer control logic (not shown). As the multiplier 216 is shared by the MMPs 218a, 218b, the arbitration mechanism controls which MMP 218a, 218b is currently using the multiplier 216.

The operand size for each MMP 218a, 218b is configurable through control logic/program store/state machine 330. In one embodiment the operand size may be configured to be 256 or 512 bits. The type of multiply operation is also configurable. In one embodiment, the type of multiply operation performed by the multiplier 216 for a particular MMP 218a, 218b may be unsigned integer or Galois Field (carry-less). Based on the configured operand size and multiply operation for a particular MMP 218a, 218b, the MMP 218a, 218b operates on the required length result vectors without explicit command encodings.

One of the MMPs 218a, 218b may perform scalar point multiplication that works efficiently for all prime ECC sizes<521 bits. The single shared multiplier 216 may work in one mode with MMP 218a and another mode with MMP 218b in an interleaved fashion. For example, MMP 218a may perform a binary ECC operation on 233 bit fields, thus requiring the multiplier to be set in 256 bits, Galois Field ({256b, GF*}) mode. MMP 218b may be operating on 384-bit prime ECC field, requiring the multiplier to be set in 512 bit, integer ({512b, int*}) mode; these operations are supported concurrently. Furthermore, each MMP may be configured to perform one of a plurality of reduction methods, such as, Barrett Reduction or Montgomery Reduction.

An ECC computation involves arithmetic operations on an elliptic curve over a finite field. A finite field consists of a finite set of elements. Addition and multiplication operations may be performed on pairs of field elements. There is one finite field containing q elements if and only if q is a power of a prime number. The order of a finite field is the number of elements in the field. A prime finite field is a field with q=p, where p is an odd prime, that is, the order of the finite field is prime because q is prime.

An ECC group has an order (that is, number of elements in the group) and every point in the ECC group also has an order (that is, the number of elements of the group that the point generates). If the order of the ECC group is prime, the order of the group is the same as the order of the point. For example, if the order of the group is 11 (a prime value), the group defined by addition modulo p=11 has 11 elements (0, . . . 10). Taking one of the points in the group, for example, 2 and performing addition by 2 mod p (with p=11), the point generates the points {4, 6, 8, 10, 1, 3, 5, 7, 9, 0, 2 . . . }, that is, 11 elements, where 1 is 12 mod 11 and 3 is 14 mod 11. However, if the order of the group is not prime, the order of the group and the order of a point in the group may not be the same. For example, if the order of the group is four in the group defined as addition modulo 4, and the point is 2, the point only generates 2 elements 0 and 2, so the order of the point is 2.

A positive integer having n+1 base b digits may be represented as a sum of multiples of base b, for example, if b is 2, n is 8 and a=1111011, then 1111011 may be represented as $1 \cdot 2^6 + 1 \cdot 2^5 + 1 \cdot 2^4 + 1 \cdot 2^3 + 0 \cdot 2^2 + 1 \cdot 2^1 + 1 \cdot 2^0$. Addition may be performed on two integers having the same number of base b digits. The product resulting from the multiplication of two integers x, y each having n base b digits has at the most 2n base b digits. Modular arithmetic includes modular addition and modular multiplication that is performed on integers modulo m, where m is a multiple-precision positive integer. The classical technique for performing modular multiplication is to compute x·y and then compute the remainder on division by m.

The elements of a prime finite field may be represented by the set of integers {0, 1, . . . , p−1} with addition defined as a+b=r mod p and multiplication defined as a·b=s mod p. The "mod p" refers to modulo p where r is the remainder when the integer result of a+b is divided by p. Barrett Reduction may be used to compute r mod p. However, when performing Barrett reduction with non-aligned field sizes in an 8-bit aligned datapath, alignment of various subvectors require a significant amount of shifting to align the operands and the result.

In an embodiment of the present invention, for an 8-bit aligned datapath and an N-bit multiplier, where N is 8-bit aligned, the modulus m is scaled to N bits. The k-bit operands are treated as N-bits. During intermediate stages of computation, intermediate results are partially reduced with respect to a scaled modulus M. At the end of the scalar point multiplication operation, the N-bit result is reduced to k-bits.

Figure 4:
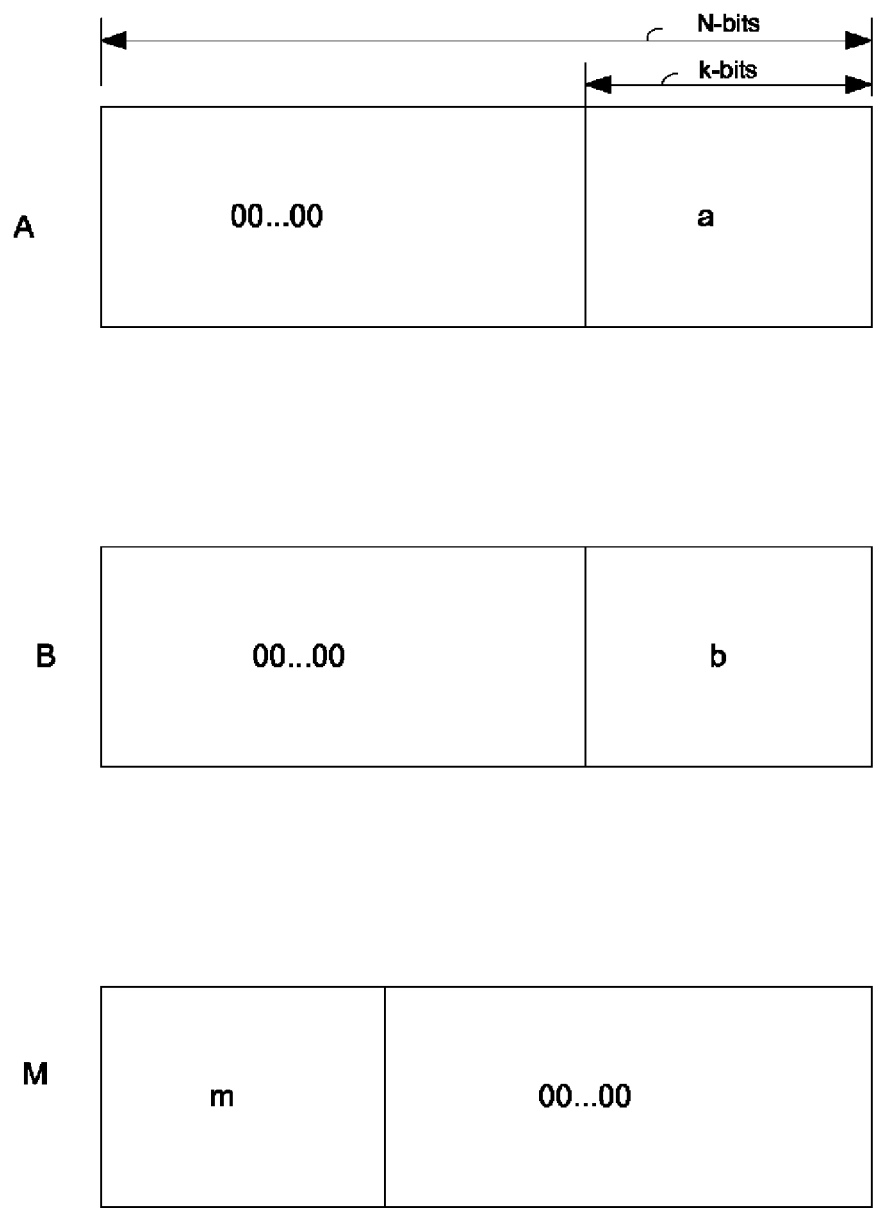
FIG. 4 is a block diagram illustrating the scaled modulus (M) and operands (A, B) according to the principles of the present invention.

FIG. 4 is a block diagram illustrating a modulus (m) and operands (a, b) for use in a modular arithmetic operation. The modulus (m) and operands (a, b) each have k-bits. Modulus scaling is provided by scaling the value of modulus m to N-bits where N is greater than k and is selected dependent on the multiplier size which is a multiple of the 8-bit aligned data path size. For example, N is selected to be 512 for a 512-bit multiplier. The operands are not scaled, but are treated as N-bit operands instead of k-bit operands.

Modulus scaling is performed instead of operand scaling because as ECC computations involve many operands, operand scaling would have to scale many numbers, whereas modulus scaling is applied to only one number, that is, the modulus. This results in reducing the number of shifting operations during the main computations by performing one slower final transformation to the non-scaled original modulus.

The bit length of operand values a, b and modulus m is k-bits, k may be one of the NIST-recommended prime field sizes, for example, 192-bits, 224-bits, 256-bits, 384-bits or 521-bits. In one embodiment having a data path size of 64-bits and a 512-bit multiplier, N may be 512 or 256.

Instead of scaling the operands (a, b), the k-bit operands (a, b) are treated as N-bit operands by adding 0s to the Most Significant bits (MSB) that are greater than the (k+1)th bit of the N-bit operands (a, b). The modulus (m) is scaled to N-bits by shifting the modulus (m) to the left by N−k bits and setting the N−k Least Significant bits (LSB) of the N-bit scaled modulus M to '0'. In an embodiment in which N is 512-bits, the modulus m is scaled to 512-bits. In another embodiment in which N is 256-bits, the modulus is scaled to 256-bits.

The scalar point multiplication is performed with a modulus M to reduce the number of shift operations and the final result is scaled back to modulus m. During intermediate stages of computation, the numbers are partially reduced with respect to the scaled modulus. At the very end of the computation, the N-bit result is converted back to k-bits.

For example, the result of point multiplication (C) of operand A by operand B may be written as follows:

$$C = A \cdot B \mod m$$

Where the result C is the remainder upon dividing the product of A·B by m

After expanding the operands and result to mod M, the result (R) may be written as follows:

$$R = A \cdot B \mod M,$$

where M>m and $M = m2^P$; where P is the number of zeros added to shift (multiply by 2)

The result R is the remainder upon dividing the product of A·B by m.

Having computed R, the result C may be derived from the Result (R) that was computed using mod M as follows:

$$C = R \mod m$$

The result C is the remainder upon dividing the result R by m.

Elliptic curve (ECC) point scalar multiplication is typically performed by performing point addition and point doubling operations. ECC point scalar multiplication may be performed to compute the result of Q=dP where d is an integer that is an element of {1, n−1} and P is a point $(x_1, y_1)$ having an order n on the elliptic curve and Q is another point $(x_2, y_2)$ on the elliptic curve. The order n of P is defined as the smallest integer which satisfies the equation: n*P=a point at infinity. If n is a prime number, the order of Q is equal to the order of P.

Point addition and point doubling operations over an ECC curve (group) have the properties shown in Table 1 below. The properties are described using a point P1 on the curve defined by co-ordinates $x_1, y_1$, a point P2 on the curve defined by co-ordinates $x_2, y_2$ and a point at infinity that is expressed as O.

TABLE 1

For point addition:

$x_1 = x_2$, $y_1 = y_2 \Rightarrow P_1 = P_2$, call point doubling.
$x_1 = x_2$, $y_1 = -y_2 \Rightarrow P_1 = -P_2$, $P_1 + P_2 = O$ For point doubling:

TABLE 1-continued $P_1 = (x_1, y_1)$
$y_1 = 0 \Rightarrow 2*P_1 = O$

As shown above in Table 1, both point addition and point doubling require comparisons of respective (x, y) co-ordinates of two points P1, P2 on the ECC curve. For example, point doubling requires checking if $y_1=0$ and point addition requires checking if point $P_1$ is equal to point $P_2$. These comparisons need to be performed using the non-scaled modulus m and thus require converting from the scaled modulus M to modulus m which requires bit shift operations with each bit shift operation consuming at least one processor clock cycle.

However, conversion of intermediate variables from the scaled modulus M to modulus m is not required when the order n of the ECC curve (group) is prime and the scalar d is in the range of [1 . . . n−1]. The order n of an ECC curve is the number of distinct points on the ECC curve, that is, n is the smallest integer that satisfies nG=point at infinity. When a scalar (integer) d is in the range of [1 . . . n−1], the point at infinity O is not reached after a single scalar point multiplication.

When n is prime, the order of Q is equal to the order of G, where Q=dG. Thus, when the order n of the ECC curve is known to be prime, a check to determine if the points to be added are equal is not required resulting in a further reduction in computation time. If the order n of the ECC curve is not a prime number, the modulus M is converted back to a residue modulo—the real modulus m for minimal intermediate variables.

Figure 5:
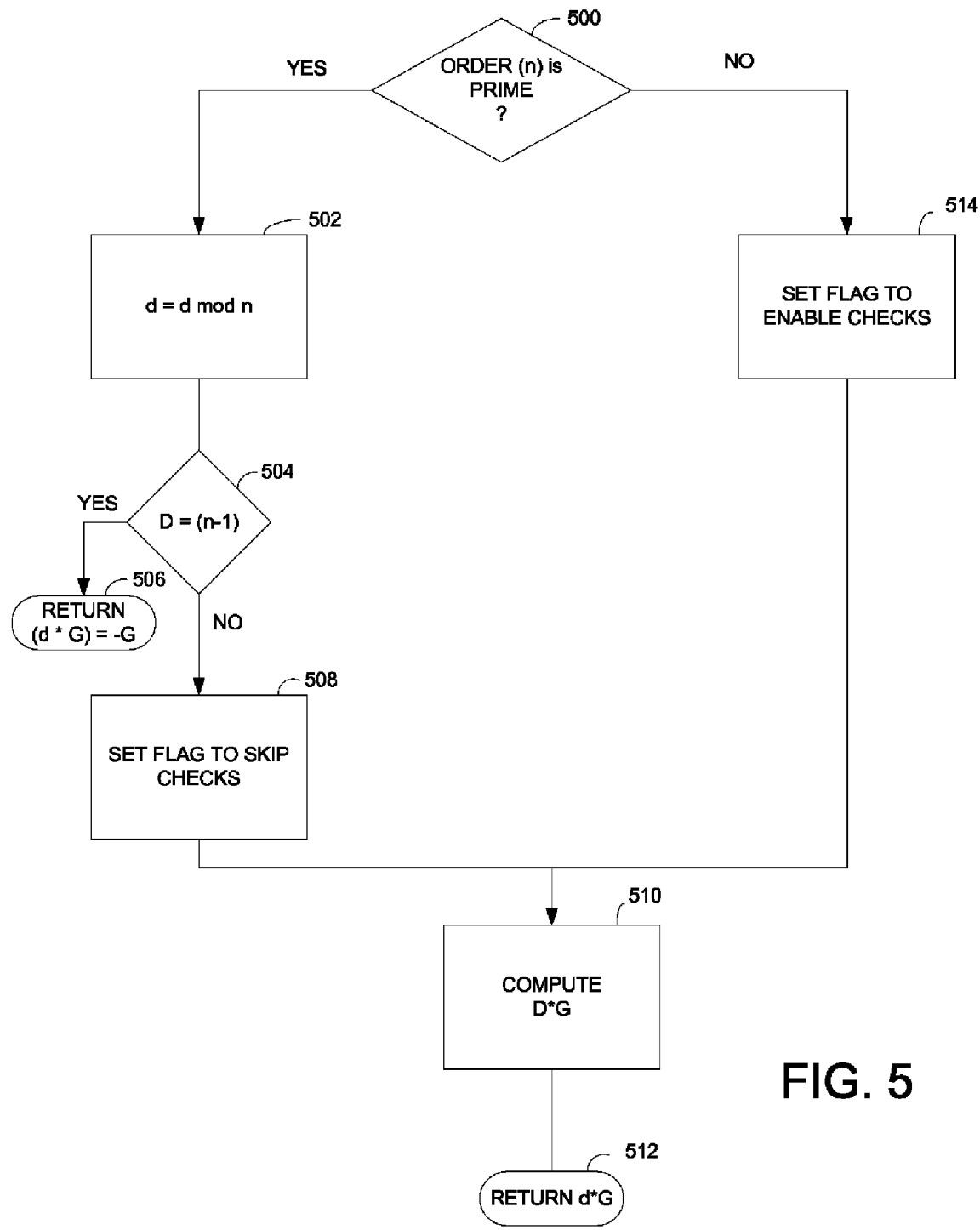
FIG. 5 is a flow-chart illustrating a method for performing ECC operations according to an embodiment of the present invention.

FIG. 5 is a flow-chart illustrating a method for performing an ECC operation to compute d*G according to an embodiment of the present invention.

At block 500, the order n of G is checked to determine if it is a prime number. If so, processing continues with block 502.

At block 502, as n is a prime number, some checks for detecting if the point at infinity may be avoided. First the scalar d is expanded to modulus N, by expanding the scalar d to N-bits by adding 0s to the Least Significant Bits (LSB) as discussed in conjunction with FIG. 4. Processing continues with block 504.

At block 504, a check is performed to determine if the scalar d is equal to n−1. If d=n−1, then a subtraction operation may result in d hitting the point of infinity O. Thus, any method for performing scalar point multiplication that involves subtraction operations cannot be used. If scalar d is equal to n−1, processing continues with block 506. If not, processing continues with block 508.

At block 506, as the scalar d is equal to the order(n)−1, the result of d*G is −G and thus −G is returned based on the point addition rules discussed in conjunction with Table 1. Processing is complete.

At block 508, a scalar point multiplication operation is to be performed to compute d*G. As the order (n) of G is prime, a flag is set so that checks for point infinity are skipped when performing the scalar point multiplication operation. Processing continues with block 510.

At block 510, point multiplication to compute the result of scalar d multiplied by a point G having co-ordinates (x, y) is performed using point addition and point doubling operations as shown in Tables 2 and 3 below.

TABLE 2

Point addition:

1. d = (x1 − x2)
2. if (d <0) d = −d
3. if (d != 0) d' = d mod m
4. else d' = d
5. if (d' =0)
   a. d = (y1−y2)
   b. if (d<0) d = −d
   c. if (d != 0) d' = d mod m
   d. else d' =d
   e. if (d' =0) { $\Rightarrow P_1 = P_2$, call point doubling; return}
   f. d = (y1+y2)
   g. if (d<0) d = −d
   h. if (d != 0) d' = d mod m
   i. else d' =d
   j. if (d' =0) { $\Rightarrow P_1 = -P_2$, $P_1 + P_2 = O$, return O}
6. else return (P1 + P2)

TABLE 3

Point doubling:

1. if (y1 != 0) d' = y1 mod m
2. else d' = y1
3. if (d' =0) { $\Rightarrow 2*P_1 = O$; return O}
4. else return 2* $P_1$ For point addition, if the order is a prime number, the checks in steps labeled the checks at 2, 3 and 5 are skipped. If the order is not prime, all of the checks are performed. Reduction modulo m may be performed in three places in the worst-case, however the conditional statement in at 5 (that is, if (d'=0)) is almost always false giving an average very close to 1, that is, the reduction at 3. The reduction modulo m at 3, 5c and/or 5h may be performed using a scale-invariant Barretts technique that does not require any shifting operations and is thus very fast. An embodiment of a scale-invariant Barrett Reduction will be described later in conjunction with FIG. 6.

Thus, for point addition, a check for point equality at 5e, that is to check if $P_1=P_2$ in order to determine if point doubling is to be performed and a check for point inverse at 5j, that is, to check if $P_1=-P_2$ in order to determine if $P_1+P_2$ is at the point of infinity (O) are only performed if the order of the ECC group is not known to be a prime number.

For point doubling, if the order of the ECC group is a prime number, the conditional statements at 1 and 3 are skipped. If the order of the ECC is not a prime number, the reduction modulo m needs to be performed in exactly one place for doubling if the y1 co-ordinate of point P1 is not equal to 0. If y1 is equal to 0, point doubling is performed that is, $2*P_1$. If y1 is equal to 0, the reduction modulo m is performed to check if the result of the reduction modulo m is 0.

Thus, by checking the primality of the order of the ECC group, that is, whether the order (n) is a prime number, a number of checks when performing point addition and point doubling in a scalar point multiplication operation on a scaled modulus M may be skipped.

Checks on the scaled co-ordinates are only performed if a user bit in the MMP is enabled to indicate that the point has an order that is not guaranteed to be prime. This allows use of the same operations shown in Tables 2 and 3 above for all cases. When an ECC curve (group) having an order that is a prime number is encountered the checking steps are skipped.

Processing continues with block 512.

At block 512, the result of the point multiplication is returned, processing is complete.

At block 514, the order n of G is not a prime number, a flag is set to indicate that checks are to be performed in the point addition and point doubling algorithms used to perform point multiplication. These checks result in a slower processing time due to the need to perform a reduction of the scalar d from the scaled modulus M to modulo m prior to performing checks to determine if the computed point is at point infinity.

In an embodiment of the present invention, computation time for performing a scalar point multiplication operation may be further reduced by decreasing the number of point addition and point doubling operations.

Scalar point multiplication may be performed using a bit-serial approach that is, starting from the Most Significant Bit (MSB) of the integer d. However, the number of point doublings and point additions for the scalar point multiplication may be reduced by using a signed digit representation, that is, d may be represented in signed digit representation with signed digits selected from the group of digits $\{-1, 0, 1\}$. One known signed digit representation is non-adjacent form (NAF).

In an embodiment of the invention, NAF is used to provide a signed digit representation of the integer d that is used for a scalar point multiplication operation to compute Q=dP. If a scalar d has n bits, NAF utilizes n point doublings and n/3 point additions. The number of point doublings is the same as a scalar point multiplication using a bit serial approach that starts from the most significant bit of scalar d. However, the number of point additions is reduced from an average of n/2 to n/3.

The scalar d is multiplied by 3 by performing a single left bit shift to provide 2d followed by an addition of d to 2d to provide 3d. Each bit of scalar d is compared with the respective bit of scalar 3d from bit position k+1 to 1 to determine the corresponding signed digit value as shown below in Table 4.

TABLE 4

| (3d, d) | Signed digit |
|---------|--------------|
| (0, 0)  | 0            |
| (0, 1)  | −1           |
| (1, 0)  | +1           |
| (1, 1)  | 0            |

For example, if the values of the respective bits are equal, for example, (00) or (11), the signed digit representation is 0. However, if the values of the respective bits are not equal, the signed digit representation is −1 or +1 dependent on whether the value of the respective bit of 3d is 0 or 1.

Thus, Q=dP is computed by scanning bits in 3d/2 and d/2 from left to right, and determining whether to apply point doubling, point addition or point subtraction based on result of a comparison of the value of a respective bit in 3d/2 and d/2. If the value of each respective bit is equal, the P is doubled, if not equal, the point is doubled and then a subtraction or addition is performed on the doubled value dependent on whether the respective bit in 3d/2 is 1 or 0 as shown in Table 2.

By scanning the pair of scalars (3d, d) from bit position k+1 down to bit position 1, that is, ignoring the least significant bit (bit 0), scalars (3d/2,d/2) are scanned by scanning bit pairs from bit position k down to bit position 0. Using this optimization 3d/2 remains in the range of k-bits and an additional word is not required in order to store 3d/2, that is, the k-bit scalar d is converted to non-adjacent form using a pair of k-bit scalars (3d/2, d/2), that is, each scalar in the pair of scalars has k-bits each. These computations may be performed on-the-fly in the MMP 218a, 218b (FIG. 2).

Table 3 below illustrates an example of point multiplication for an 8-bit scalar d having a value '1011 01 10'. 2d is the result of shifting d to the left by one digit, that is, '101101100'. 3d is the result of adding d and 2d, that is, '1000100010'.

TABLE 5

|   |   |   |   |   |   |   |   |   |      |
|---|---|---|---|---|---|---|---|---|------|
|   | 1 | 0 | 1 | 1 | 0 | 1 | 1 | 0 | (d)  |
| 1 | 0 | 1 | 1 | 0 | 1 | 1 | 0 |   | (2d) |
| 1 | 0 | 0 | 1 | 0 | 0 | 0 | 1 | 0 | (3d) |

A scalar point multiplication operation is performed on 3d/2 and d/2 by performing scalar point doubling and scalar point addition on the operands, that is, 3d/2 and d/2 starting with the respective Most Significant Bit (MSB) of each operand. 3d/2 and d/2 are computed by shifting the values of 3d and d to the right by one digit as shown in Table 6 below:

TABLE 6

| 1 | 0 | 0 | 0 | 1 | 0 | 0 | 0 | 1 | (3d/2) |
| 0 | 0 | 1 | 0 | 1 | 1 | 0 | 1 | 1 | (d/2)  |

For example, starting with the MSB of 3d/2 and d/2, the MSB of 3d/2 is 1 and the MSB of d/2 is 0. Referring to Table 1, with (3d/2, d/2) equal to (1, 0) the result of the comparison corresponds to signed digit +1. Thus, for the MSB-1, both bits are 0, and point doubling is performed. Thus to compute Q=dP, with d="1011 0110", the scalar point multiplication is performed using the sequence of point doubling, point addition/subtraction operations shown in Table 7 below.

TABLE 7

| 1  | 0 | 0  | 0 | 1  | 0  | 0 | 0  | 1   | (3d/2) |
| 0  | 0 | 1  | 0 | 1  | 1  | 0 | 1  | 1   | (d/2)  |
| +1 | 0 | −1 | 0 | 0  | −1 | 0 | −1 | 0   |        |
| 1  | 2 | 3  | 6 | 12 | 23 | 46| 91 | 182 |        |

As shown in Table 7, there are 5 point doublings (when respective bits are equal) and 4 point addition/subtraction (when respective bits are not equal) operations to perform the scalar point multiplication of Q=dP. The result of the scalar multiplication with d="1011 0110" is 182P. Thus, computation time for performing a scalar point multiplication operation Q=dP is reduced by reducing the number of point additions from an average of n/2 to n/3 where n is the number of digits in the scalar d.

Figure 6:
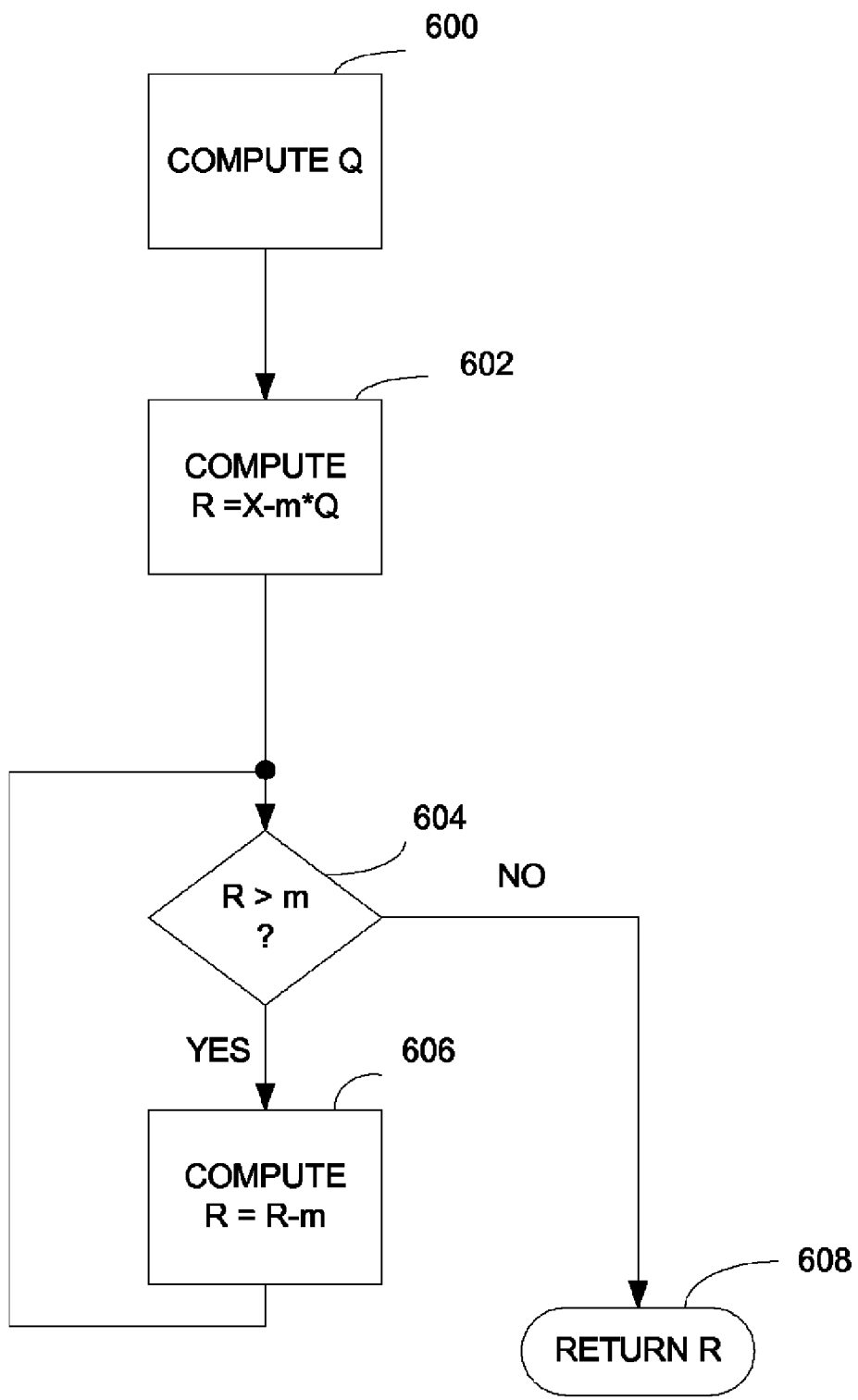
FIG. 6 is a flow chart illustrating an embodiment of a method for reducing a result of a modular arithmetic operation performed with a scaled modulus M to a result based on an original modulus m.

FIG. 6 is a flow chart illustrating an embodiment of a method for reducing a result of a modular arithmetic operation performed with a scaled modulus M to a result based on an original modulus m.

After a result of a modular arithmetic operation has been computed with respect to the scaled modulus M, a final transformation is performed to reduce the result of the scalar multiplication with respect to the original modulus m.

Barrett reduction is a known method for reducing a first number (having 2k bits) modulo a second number (having k bits). Knowing that the k least significant digits of the 2k-bit first number are not necessary to compute a result, only a partial multiple-precision multiplication is necessary using a pre-computed constant $g=\text{floor}(b^{2k}/m)$, where b is the radix. If b is 2, then k is the number of bits in the first number and the second number.

Barrett Reduction computes a result r=X mod m as shown below in Table 8 where X, m and g are positive integers, X has 2k bits, m has k bits and $\mu=\text{floor}(2^{2k}/m)$.

TABLE 8 q1 = floor (X/b$^{k-1}$)
q2 = q1 * µ
q3 = floor (q2/b$^{k+1}$)
r1 = X mod b$^{k-1}$
r2 = q3 * mod b$^{k+1}$
r = r1 – r2
if r < 0 then r = r + b$^{k+1}$
while r >= m { r = r – m}

Barrett reduction shown in Table 8 may be applied to the result of a modular arithmetic operation such as scalar point multiplication with respect to an N-bit scaled modulus M. However, as the number of bits in original modulus m may not be N/2, Barrett reduction requires a large number of bit-shifting operations to extract and align various sub vectors.

Furthermore, Barrett Reduction as shown in Table 8 cannot be applied in the case in which a number of bits in an operand are less than half the number of bits of the modulus. For example, Barrett reduction as shown in Table 8 cannot be applied to a P-192 ECC curve defined by NIST with a scaled modulus M of 512 bits because 192 is less than half of the number of bits in the scaled modulus M, that is, 512/2 (256).

In an embodiment of the invention, the result of the scalar multiplication with respect to the scaled modulus M having N-bits is reduced to k-bits with respect to the modulus m where k is less than N through a scale invariant Barrett Reduction in order to avoid costly bit-level shifting operations.

Instead of computing µ=floor(b$^{2k}$/m) as required by Barrett Reduction, a scaled reduction parameter µ is pre-computed using Equation 1 below:

$$\mu = \text{floor}(2^N/m)$$  Equation 1

The scaled reduction parameter µ is used to compute the result (R) and may be computed using regular division which takes a fixed amount of time. The floor function is a mathematical function that returns the largest integer value less than or equal to (2$^N$/m).

Figure 7:
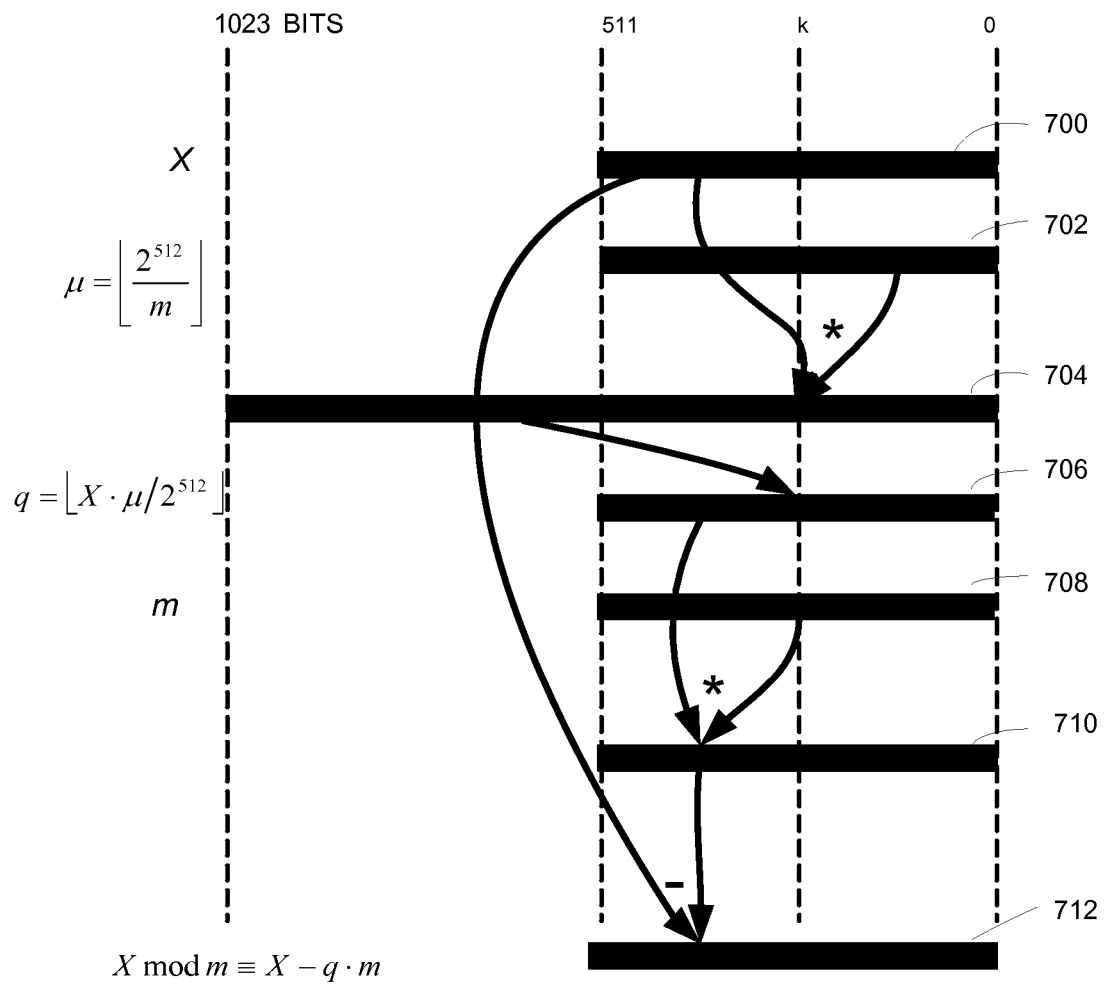
FIG. 7 is a flow diagram illustrating the computations performed for reducing the N-bit result modulo a k-bit modulus m.

FIG. 7 is a flow diagram illustrating the computations performed for reducing the N-bit result modulo a k-bit modulus m. FIG. 7 will be described in conjunction with FIG. 6.

Referring to FIG. 6, at block 600, Q is computed using the pre-computed scaled reduction parameter µ and X which is an N-bit result to be reduced modulo a k-bit modulus m according to Equation 2 below.

$$Q = \text{floor}[(\mu * X)/2^N]$$  Equation 2

The multiplication operation, that is, µ*X has N-bit operands and results in a 2N-bit product that needs to be reduced to a k-bit result. This enables the number of shift operations in the main computations in the ECC point operation (or a modular exponentiation) to be reduced. This is particularly useful in the context of ECC where field sizes (prime/binary) are not expected to be multiples of 64 (or even 32 in some cases) bits.

Referring to FIG. 6, X is stored at 700 and µ is stored at 702. In the embodiment shown N is 512. The number of bits in µ is dependent on the number of bits in modulo m. For example, if m is 384-bits, N is 512-bits and µ is 128 bits. The result of µ*X (512+128 bits) is stored at 704.

The least significant N-bits of the 2N-bit Q are not needed to compute the result, thus the most significant N-bits of the 2N-bit product of µ*X are selected at 606. In one embodiment, the most significant bits may be selected by using a pointer/scale adjustment in the MMP 218a, 218b to avoid shift operations. For example, the result of the multiply operation is 512*512=1024 bits which is represented as 16 quad-words (64-bits) in memory. Thus, the variable (full result) that points to the result is a quad-word pointer data structure with a reference count of 16. Ignoring the scale adjustment for simplicity, in order to extract the most-significant bits of the full result by skipping over the N least significant bits, a variable top_result is computed by adding 8 (that is, 256 bits (8×64 bits)) to the full result variable. This may be computed using a simple one-cycle instruction with no shifting/aligning required.

Returning to FIG. 6, at block 602, after Q has been computed at 706 (FIG. 7), the result modulo m is computed iteratively through the use of subtraction operations to provide the remainder (R) mod m. On average the number of iterations is about one in contrast to the use of the standard Barrett Reduction which typically requires 2 or 3 iterations. The initial remainder (R) is computed using equation 3 below:

$$R = X - m*Q$$  Equation 3

The multiplication operation, that is m*Q is performed with 512 bit operands shown at 706 (FIG. 7) and 708 (FIG. 7). X (at 600) is subtracted from result of the multiplication operation (at 710).

At block 604, the result R is compared with modulus m. The final remainder mod m is computed by subtracting m from the remainder (R) until the remainder is less than m as shown in the code snippet in Table 9 below:

TABLE 9

While (R > m) {R = R – m;}

If result R is greater than modulus m, processing continues with block 606 to subtract modulus m from the result R. If result R is not greater than modulus m, the final result R has been computed, processing is complete.

At block 608, the result R is returned. The computation of the result mod m may be used for integer fields or binary fields. In one embodiment, X is a 512 bit positive integer to be reduced modulo a k-bit modulus m where k is less than 512. In other embodiments M may be 2$^k$ with k selected such that the number of bits in M is greater than the number of bits in m.

For example, in an embodiment for a NIST curve having a 384-bit prime field and a 512-bit multiplier, M has 512 bits and m has 384 bits. Thus, substituting 2384 for m in Equation 1 above, µ is a 128-bit (512-384) value that is stored in a 512-bit field. The modulo 384-bit result is computed from the modulo 512-bit result using the operations shown in Equations 1-4 and Table 8 as discussed in conjunction with FIGS. 6 and 7.

Having pre-computed the 128-bit scaled reduction parameter value µ, the 128-bit µ is multiplied by 512-bit value X in the 512×512 multiplier to provide a 620-bit product. According to Equation 2, the Most Significant 512-bits of the 620-bit product are right shifted by 512-bits such that the Most Significant 128-bits of the 620-bit product are stored in the least significant 512-bits as Q. According to Equation 3, the 128-bit Q is multiplied by the 384-bit modulus m to provide a 512-bit product which is reduced to a 384-bit result by subtracting the 384-bit modulus m until the result is less than the 512-bit value X. This is achieved through the use of a single pointer addition operation, that is, no bit shifts are necessary. For example, first, m*Q is subtracted from X, and then m is iteratively subtracted as needed until the resulting remainder is less than m. The remainder after the subtraction operations is the 384-bit result.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising: performing operations on points in an Elliptic Curve Group (EC G) having a k-bit generated modulus, k being one of 192, 224, 256, 384 or 521, using an N-bit scaled modulus, N being greater than k; upon detecting that the order of the ECG is prime, skipping the performing of an operation to reduce a point in the ECG based on the scaled modulus to the generated modulus prior to performing a test to determine if the point is at a point of infinity (O); and storing, by a processor, storing a result of the performing operations of points in the ECG in a memory.

2. The method of claim 1, wherein the test checks point equality.

3. The method of claim 1, wherein the test checks point inverse.

4. The method of claim 1, wherein the operations on points uses a k-bit scalar d represented in non-adjacent form with each digit assigned a value −1, 0, or +1.

5. The method of claim 4, wherein the k-bit scalar d is converted to non-adjacent form using a pair of k-bit scalars (3d/2, d/2).

6. The method of claim 1, wherein N is 512.

7. The method of claim 1, wherein the N-bit scaled modulus is 64-bit aligned.

8. An apparatus comprising: an encryption unit to perform operations on points in an Elliptic Curve Group (ECG) having a k-bit generated modulus, k being one of 192, 224, 256, 384 or 521, using an N-bit scaled modulus, N being greater than k, and upon detecting that the order of the ECG is prime, to skip the performing of an operation to reduce a point in the ECG based on the scaled modulus to the generated modulus prior to performing a test to determine if the point is at a point of infinity (O); and a memory to store a result of the performing of the operations on points in the ECG.

9. The apparatus of claim 8, wherein the test checks point equality.

10. The apparatus of claim 8, wherein the test checks point inverse.

11. The apparatus of claim 8, wherein the operations on points uses a k-bit scalar d represented in non-adjacent form with each digit selected from the redundant set consisting of −1, 0 and +1.

12. The apparatus of claim 11, wherein the k-bit scalar d is converted to non-adjacent form using a pair of k-bit scalars (3d/2, d/2).

13. The apparatus of claim 8, wherein N is 512.

14. The apparatus of claim 8, wherein the N-bit scaled modulus is 64-bit aligned.

15. A system comprising: a dynamic random access memory to store data and instructions; and a processor coupled to said memory to execute the instructions, the processor comprising: an encryption unit to perform operations on points in an Elliptic Curve Group (ECG) having a k-bit generated modulus, k being one of 192, 224, 256, 384 or 521, using an N-bit scaled modulus, N being greater than k, and upon detecting that the order of the ECG is prime, to skip the performing of an operation to reduce a point in the ECG based on the scaled modulus to the generated modulus prior to performing a test to determine if the point is at a point of infinity (O) and to store a result of the performing of the operations in the ECG in the dynamic random access memory.

16. The system of claim 15, wherein the test checks point equality.

17. The system of claim 15, wherein the test checks point inverse.

18. The system of claim 15, wherein the operations on points uses a k-bit scalar d represented in non-adjacent form with each digit selected from the redundant set consisting of −1, 0 and +1.

19. The system of claim 18, wherein the k-bit scalar d is converted to non-adjacent form using a pair of k-bit scalars (3d/2, d/2).

20. The system of claim 15, wherein N is 512.

* * * * *